Figure 3:
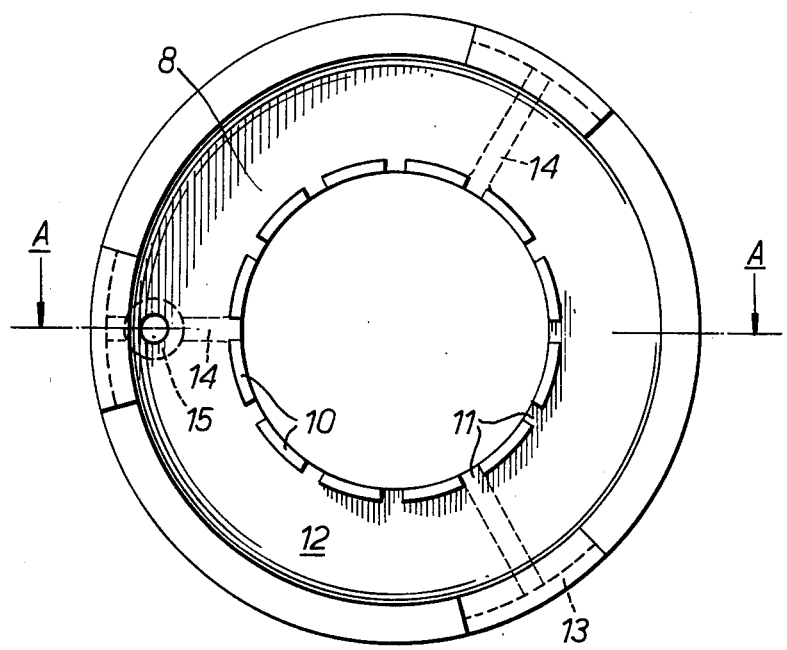

United States Patent [19]

Carrington

[11] 4,081,377
[45] Mar. 28, 1978

[54] AQUARIA FILTRATION EQUIPMENT

[75] Inventor: Jeffery Neville Carrington, Dorking, England

[73] Assignee: Liquifry Company Limited, Surrey, England

[21] Appl. No.: 668,664

[22] Filed: Mar. 22, 1976

[30] Foreign Application Priority Data

Mar. 26, 1975   United Kingdom ............... 12790/75

[51] Int. Cl.² ........................................... B01D 23/18
[52] U.S. Cl. ....................................... 210/169; 119/5
[58] Field of Search ............................ 119/5; 210/169

[56] References Cited

U.S. PATENT DOCUMENTS

| | | | |
|---|---|---|---|
| 3,151,069 | 9/1964 | Halpert | 210/169 |
| 3,472,381 | 10/1969 | Halpert | 210/169 |
| 3,490,416 | 1/1970 | Kelley et al. | 119/5 |

*Primary Examiner*—Hugh R. Chamblee
*Attorney, Agent, or Firm*—Larson, Taylor and Hinds

[57] ABSTRACT

Aquarium filtration equipment in the form of an under gravel or sub-gravel filter, the equipment comprising a synthetic plastics plate from the general plane of which a plurality of substantially regularly spaced columns project downwardly, their lower ends being contained in a common plane which is inclined to the general plane of the plate, said plate also comprising means for connecting an airlift or other water circulating means thereto at a location on said plate where the spacing between the inclined general plane of the plate and the common plane containing the lower ends of the columns is at substantially its maximum.

8 Claims, 4 Drawing Figures

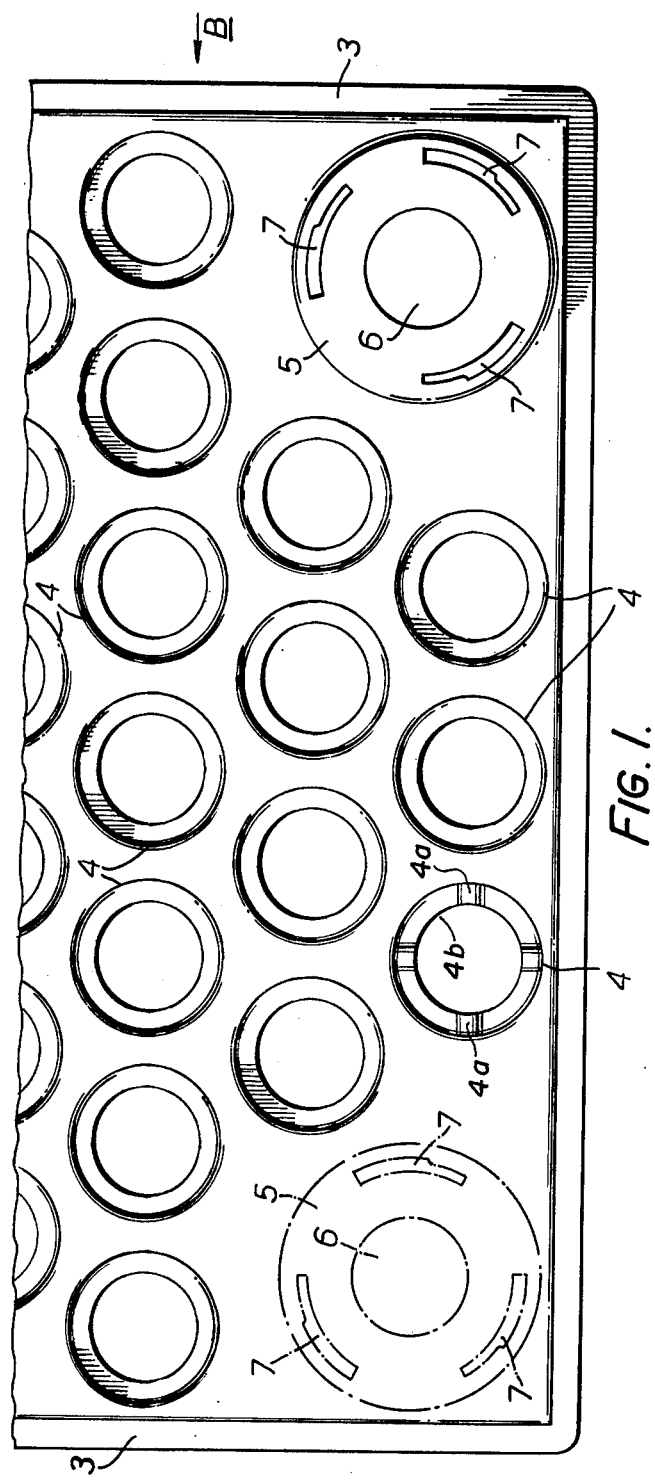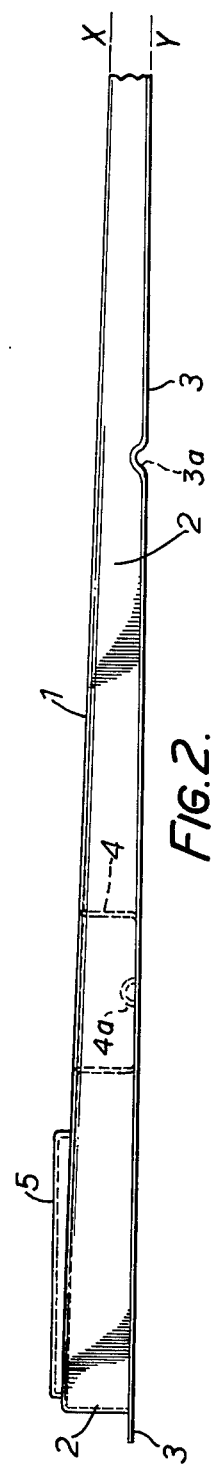

AQUARIA FILTRATION EQUIPMENT

This invention relates to aquaria filtration equipment.

One of the items of equipment that is employed in maintaining an aquarium in a healthy condition is an under gravel or sub-gravel filter. Such a filter consists of a plate which is located beneath the gravel and with which is associated a so-called airlift or other means to cause the water in an aquarium tank to pass downwardly through the gravel and through openings in the underlying plate, the filtered water being returned to the free volume thereof within the tank at a level above that of the filter and overlying gravel. The water in the aquarium tank thus circulates slowly but continuously through the gravel which functions in much the same way as a filtration bed in a sewage farm, that is to say, a somewhat gelatinous bacterial plaque forms on the gravel particles and this acts to break down biochemical and other organic compounds in the water which greatly assists in keeping the water in good condition. The gravel bed also tends to collect many small insoluble organic and inorganic particles from suspension in the water and thus assists in keeping the water in an attractively clear state.

In most of the under gravel filters that are currently employed, the filter plate is of substantially planar configuration and has a rim which maintains it in parallel but spaced relationship with the bottom of the aquarium tank in which it is used. The plate is formed by moulding a synthetic plastics material and the openings therein are in the form of a plurality of narrow slots. An under gravel filter is, however, also known in which the filter plate is made by vacuum-shaping a synthetic plastics sheet in such a way that depressions are produced in the plate, the depressions being formed with the required slots. These known forms of under gravel filter both suffer from at least one of the following disadvantages. Firstly, that the slotted filter plate is unsupported from the bottom of the aquarium tank over such large areas that it will not bear the weight of fish-refuge rocks, ornamental items and the like that may be placed on the surface of the overlying gravel without failure or distortion to an extent such that the filtering action is very adversely affected. Secondly, since the airlift or other water circulating means is almost always positioned near one corner of a rectangular aquarium tank, or at least near one end thereof, the circulation of the water through the gravel at locations relatively remote from the airlift or other water circulating means tends to be very sluggish indeed and progressively more rapid as the proximity of said means increases. The known under gravel filters do not provide any compensation for this second disadvantage and, accordingly, are not as efficient as they might be because, with their use, it is only in relatively small regions of aquarium tanks that the water flows through the under gravel filters at a speed which allows of really efficient filtration whilst in the remaining much larger regions of those tanks, the water passes through the gravel either too slowly, or too quickly, for optimum filtration to be attained.

It is an object of the present invention to provide aquaria filtration equipment which avoids the disadvantages of known under gravel filters that are discussed above or which at least reduces those disadvantages to a significant extent.

According to the invention, there is provided aquarium filtration equipment for use in an aquarium tank, wherein the equipment comprises a synthetic plastics plate shaped to define a plurality of substantially uniformly spaced, hollow, plate-supporting columns that project downwardly from the general plane of the plate, the columns being open at least at their upper ends so as to interconnect the interiors of the columns and the space above the general plane of said plate, and also defining side openings which interconnect the interiors of the columns and the space beneath the general plane of the plate, said columns having their lower ends contained in a common plane that is inclined to said general plane, and wherein means for the connection to said plate of at least one water circulating means is provided in a region of that plate where the general plane thereof is at substantially its greatest spacing from said common plane which substantially contains the lower ends of the columns.

Figure 4:
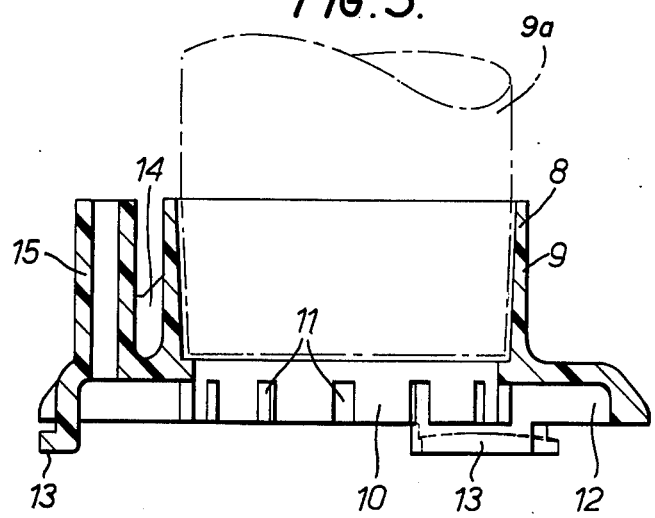

For a better understanding of the invention, and to show how the same may be carried into effect, reference will now be made, by way of example, to the accompanying drawings, in which:

FIG. 1 is a diagrammatic plan view of one end of an under gravel filter plate of aquarium filtration equipment in accordance with the invention, FIG. 2 is a diagrammatic side elevation of the plate of FIG. 1 as seen in the direction indicated by an arrow B in that Figure, FIG. 3 is an underneath plan view, to an enlarged scale, of an airlift of equipment in accordance with the invention that is intended for use in co-operation with the under gravel filter plate of FIGS. 1 and 2, and FIG. 4 is a section taken on the line A—A in FIG. 3.

Referring to the drawings, FIGS. 1 and 2 thereof diagrammatically illustrate one end of an under gravel filter plate 1 that is vacuum formed from a synthetic plastics material which it is preferred should be a suitable grade of polystyrene, having only slight flexibility, in its natural colour although any desired coloring pigment may, of course, be added if desired. It will be seen from FIG. 2 of the drawings that the plate 1 is of basically planar configuration, the general plane of that plate being indicated in FIG. 2 by the reference X. The plate 1 of which one end is illustrated in FIGS. 1 and 2 is of oblong configuration and has overall measurements of substantially 30 centimeters by substantially 53 centimeters. The plate 1 has a downwardly directed rim 2 at all four of its edges and the foot of said rim 2 is perpendicularly bent over in an outward direction to form a uniplanar flange 3.

The plate 1 is shaped to define a plurality of columns 4 of which there may, for example, be about sixty in the particular example which is being described. The columns 4 are substantially uniformly spaced apart from each other and each of them projects downwardly from the general plane of the plate 1 in such a way that its open upper end coincides with that plane. It is preferred that at least the upper ends of the columns 4 should be of right circular cylindrical configuration, as illustrated, and the lowermost ends thereof are open. However, the lowermost open end of each column 4 has a perpendicularly bent-over inwardly directed rim (one such rim being indicated at 4b in FIG. 1) which has a radial width of substantially 3 millimeters. Each such rim is formed at regular intervals therearound with a number of upwardly arched rebates, the arched rebates of only one rim being shown in FIG. 1 at 4a, and a single such arched rebate being indicated schematically at 4a in FIG. 2. It will be understood that such rebates are formed in each rim, but for convenience have not been shown in each rim. Each rebate 4a conveniently has a width of substantially 3 millimeters and a maximum height of substantially 2 millimeters but these dimensions may be increased or decreased if a coarser or finer gravel mesh size is to be used. There may conveniently be six rebates in each rim arranged at 60° intervals around the upright longitudinal axis of the corresponding column 4. The arched rebates 4a afford openings in the columns 4 through which aquarium water can flow in the use of the equipment and it has been found that this particular way of forming those openings strengthens the columns 4 as compared with the provision of slots whilst appreciably simplifying the tooling that is required to make the equipment. Nevertheless, the formation of openings in the manner that has just been described is not essential and slots can, if preferred, be punched in the walls of the columns 4. Arched rebates (only one of which is shown at 3a in FIG. 2) are, preferably, also formed in the rim 2 at substantially 5 centimeter intervals around the whole of the periphery of the plate 1 to avoid the formation of stagnant patches of gravel in that region.

In accordance with a feature of the invention, the lower ends of all of the columns 4 are substantially contained in a common plane that is indicated in FIG. 2 of the drawings by the reference Y and it is greatly preferred, but is not absolutely essential, that the common plane Y should also contain the flange 3. As will be apparent from FIG. 2 of the drawings, the general plane X of the plate 1 and the common plane Y that substantially contains the lower ends of all of the columns 4 are inclined to each other. The angle of inclination is very small and the construction and arrangement are such that the planes X and Y are furthest remote from each other at the end of the plate 1 which can be seen to the left of FIG. 2 and are closest to one another at the opposite end of the plate 1 which is not illustrated in the drawings. In the particular example which is being described, the planes X and Y are spaced apart from one another by substantially 16 millimeters at the illustrated end of the plate 1 but are spaced apart from one another by only substantially 5 millimeters at the opposite end of that plate. The height of each column 4 is, of course, dependent upon its location on the plate 1 so that the columns 4 which are at and near the illustrated end of the plate 1 are of the greatest height whilst those which are at and near the opposite end of said plate are of the smallest height. It should, perhaps, be mentioned that, whilst a right circular cylindrical configuration for each column 4 is preferred, the columns may have cylindrical shapes of alternative cross-section such as, purely for example, hexagonal or octagonal.

A circular platform 5 is provided at one corner of the end of the plate 1 that is illustrated in FIGS. 1 and 2 of the drawings and it will be noted that the platform 5 projects above the general plane X of the plate 1 in such a way that its upper surface is parallel to the common plane Y, that the platform 5 is formed with a central circular opening 6 and that three curved bayonet slots 7 are formed in the upper surface of the platform 5 at 120° intervals around its center point. The platform 5 provides for the connection to the plate 1 of water circulating means in the form of an airlift 8 that will be further described below. The platform 5 is, it will be noted, provided in the region of the plate 1 where the general plane X of that plate is at substantially its greatest spacing from the plane Y and it will also be noted that, if desired, a second or alternative platform 5 may be provided at the other corner of the illustrated end of the under gravel filter plate 1. The second platform 5 is shown in broken lines in FIG. 1 of the drawings but, where the arrangement of the aquarium with which the equipment is to be used requires it, the second platform 5 may be employed in preference to the platform shown in full lines in which case the latter platform will not be formed with its opening 6 and bayonet slots 7. Alternatively, in circumstances where a faster than usual rate of filtration is required, both platforms 5 may be employed in co-operation with corresponding airlifts 8.

The airlift 8 that is shown in FIGS. 3 and 4 of the drawings to a larger scale than that employed in FIGS. 1 and 2 thereof is preferably moulded from polyethylene, polypropylene or polystyrene that is of its natural colour or that is tinted by employing a suitable pigment. Other materials could be employed as alternatives. The airlift has a central tube 9 which is formed with a gentle downward taper, the internal diameter of the tube 9 in the example which is being described being substantially 27½ millimeters at its upper end. The upright length of the tube 9 is quite short, of the order of 1 centimeter, since it is designed to co-operate frictionally with the lowermost end of an upward extension tube 9a shown in broken line outline in FIG. 4. In accordance with conventional practice, the extension tube will have a length which is such that its upper end opens substantially at, or just beneath, the surface of the water in an aquarium tank in which the equipment is employed. The lowermost end of the central tube 9 of the airlift 8 opens into a ring 10 which communicates, by way of a plurality of slots 11, with a surrounding annular chamber 12. In the example which is being described, there are twelve of the slots 11 that are angularly spaced apart from one another at regular 30° intervals around the longitudinal axis of the central tube 9 and ring 10. Each slot 11 may conveniently, but not essentially, have a width of 1.6 millimeters and a height of 3 millimeters, the optimum slot size and shape being dictated by the air pressure that is available and by the surface tension of the aquarium water. The outer rim of the chamber 12 is formed at three locations which are spaced apart from one another at 120° intervals around the axis which has just been mentioned with bayonet lugs 13 each of which lugs, as will be seen from the right-hand lug illustrated in FIG. 4 of the drawings, has a convexly curved upper surface. The assembly is strengthened by three ribs 14 which integrally interconnect the external wall of the central tube 9, the top surface of the chamber 12 and portions of the respective three lugs 13.

One of the three ribs 14 incorporates an upwardly directed air supply pipe 15 whose lowermost end opens into the annular chamber 12 and whose uppermost end can be connected, in a conventional manner, to the outlet pipe of an air supply, such as an aquarium air pump, by way of a length of flexible rubber, synthetic rubber or synthetic plastics tubing. The equipment also comprises a splash deflector (not shown) that may be fitted to the uppermost end of the previously mentioned upward extension tube that is also not illustrated in the drawings. The splash deflector is designed to prevent small droplets of water from splashing onto a cover of an aquarium tank in which the equipment is employed or outside the tank when no cover is provided. The upward extension tube 9a will have a similar internal diameter to the central tube 9 of the airlift 8 and that diameter is sufficient to receive an immersed electric heating unit of small diameter without significant reduction in the filtering efficiency of the equipment. The electric heating unit will function in water that has passed through the filter bed of the equipment and that is about to be returned to the free water within the aquarium tank and this can be a considerable advantage because marine invertebrates that are often kept in such tanks have a tendency to attach themselves to the tubular casings of electric heating units where they are frequently killed by the localized high temperature. With the arrangement which has just been described, such marine invertebrates do not have access to the electric heating unit. Although the provision of an electric heating unit in the upward extension tube 9a of the airlift 8 inevitably reduces the effective cross-sectional area of that tube, it should be borne in mind that this is, to some extent, compensated for by the convection effect that is produced inside the extension tube when the water therein is raised in temperature by the heating unit. The deflector (not illustrated) is designed to accept an electric supply cable to a heating unit situated within the upward extension tube.

In the use of the equipment which has been described, the under gravel filter plate 1 is first placed at the bottom of the aquarium tank. The airlift 8 is fitted to the slotted and apertured platform 5 at one corner of the plate 1 by entering the bayonet lugs 13 downwardly through the three bayonet slots 7 and angularly twisting the airlift 8 about the axis of its central tube 9 to engage the lugs 13 reliably beneath the top of the platform 5. A layer of filter gravel is then spread over the top of the plate 1 in such a way that it substantially fills all of the columns 4 and extends to a level a little above that of the top of the platform 5. The term "gravel" is to be interpreted as including mineral sand, coral sand, crushed cockle shells and artificial granular filtering materials within its scope as well as natural gravel. Rocks intended to provide refuge for many species of fish will usually be placed on top of the gravel layer and it will be realised that the construction of the under gravel filter plate 1 is such that it receives direct support from the bottom of the tank not only by way of its rim 2 and flange 3 but also by way of each of the substantially uniformly spaced columns. Thus, even quite heavy rocks do not cause deflection of the under gravel filter plate 1 to any significant extent. Ornamental items, such as "sunken galleons" may also be placed on the gravel layer and such items also do not cause any significant distortion of the plate 1. As is conventional, the platform 5 and airlift 8 are located at one corner of the oblong under gravel filter but the second disadvantage of known under gravel filters that is discussed at the beginning of this specification is avoided, or very significantly reduced, because the airlift 8 is provided in a region of the plate 1 where the general plane X thereof is at substantially its greatest spacing from the plane Y which substantially contains the lower ends of all of the columns 4. When the aquarium tank is filled with water, the depth thereof beneath the plate 1 at the end of that plate that is illustrated in FIGS. 1 and 2 of the drawings is relatively great and is progressively reduced towards the opposite end of the plate at which said depth is relatively small. The effect of this, when the equipment is in use, is to produce a substantially uniform speed of flow of the water through the gravel bed and the columns 4 at all locations throughout the area of the bottom of the tank. The circulation of the water is caused by supplying air under pressure to the pipe 15 from which that air fills the chamber 12 and bubbles through the slots 11 into the central tube 9 drawing with it water from underneath the plate 1. The air bubbles and entrained water pass upwardly through the central tube 9 and fitted extension tube (not shown) and escape back into the free water within the tank at, or just beneath, the surface thereof. As previously described, the water in the tank may advantageously be heated by an electric heating unit disposed within the upward extension of the airlift 8 and the deflector fitted to the top of that tube prevents splashing onto any fitted cover of the aquarium tank or onto the surroundings of the tank when a cover is not provided. The airlift 8 and its upward extension tube can be removed from the equipment for cleaning or other purposes, without disturbing the under gravel filter plate 1, merely by brushing aside the gravel immediately surrounding the airlift 8 and subsequently releasing the bayonet connection between that airlift and the platform 5 of said plate 1.

If desired, the airlift 8 may be replaced by alternative water circulating means in the form of a known so-called "air stone" which will be located at the bottom of an upright tube, equivalent to the tube 9, in connection with an air supply, such as an aquarium air pump, disposed outside the aquarium tank.

I claim:

1. Aquarium filtration equipment for use in an aquarium tank, wherein the equipment comprises a synthetic plastics plate shaped to define a plurality of substantially uniformly spaced, hollow, plate-supporting columns that project downwardly from the general plane of the plate, the columns being open at least at their upper ends so as to interconnect the interiors of the columns and the space above the general plane of said plate, and also defining side openings which interconnect the interiors of the columns and the space beneath the general plane of the plate, said columns having their lower ends contained in a common plane that is inclined to said general plane, and wherein means for the connection to said plate of at least one water circulating means is provided in a region of that plate where the general plane thereof is at substantially its greatest spacing from said common plane which substantially contains the lower ends of the columns.

2. Equipment according to claim 1, wherein said plate is formed with a downwardly directed rim and said rim has an outwardly directed flange that is contained in said common plane.

3. Equipment according to claim 2, wherein the rim defines a plurality of openings therethrough.

4. Equipment according to claim 1, wherein said connection means comprises a platform on said plate, the platform defining a central opening and having a plurality of bayonet connections around said opening.

5. Equipment according to claim 1, wherein the water circulating means comprises a tubular airlift having parts shaped for coupling co-operation with said connection means.

6. Equipment according to claim 5, wherein an upright extension tube is provided that is connectible to said tubular airlift.

7. Equipment according to claim 1 wherein the side openings defined by said columns are of arched configuration.

8. Equipment according to claim 7, wherein each column side opening has a width of substantially 30/254 of an inch (3 millimeters) and a height of not more than substantially 10/127 of an inch (2 millimeters).

* * * * *